United States Patent [19]

Drumm

[11] Patent Number: 5,101,081
[45] Date of Patent: Mar. 31, 1992

[54] GRAPHICS SURFACE ASSEMBLY WITH CALIBRATING MEMORY DEVICE

[75] Inventor: Donald E. Drumm, Billerica, Mass.

[73] Assignee: Wang Laboratories, Inc., Lowell, Mass.

[21] Appl. No.: 675,250

[22] Filed: Mar. 25, 1991

[51] Int. Cl.$^5$ .............................................. G08C 21/00
[52] U.S. Cl. .................................................... 178/18
[58] Field of Search .................................... 178/18, 19

[56] References Cited

U.S. PATENT DOCUMENTS 4,645,869 2/1987 Rockwell et al. .................... 178/18
4,650,926 3/1987 Nakamura et al. ................... 178/18

*Primary Examiner*—Stafford D. Schreyer
*Attorney, Agent, or Firm*—Michael N. Shanahan; Kenneth L. Milik

[57] ABSTRACT

An electrographic system comprises a graphics surface assembly having a graphics surface integrally coupled to a memory device which contains calibration data designated for the graphics surface. During manufacturing, the memory device is mounted onto an interface board which is attached to the graphics surface through a flex cable. A calibration procedure is performed on the graphics surface whereby calibration data is generated and stored in the memory device. The memory device, loaded with the calibration data, is thereafter linked to its associated graphics surface.

19 Claims, 4 Drawing Sheets

GRAPHICS SURFACE ASSEMBLY WITH CALIBRATING MEMORY DEVICE

BACKGROUND OF THE INVENTION

Conventional computers offer a full range of features including a hard disk drive, a floppy disk drive, a microprocessor, a liquid crystal display (LCD), and a keyboard. Typically, the user interface for conventional computers comprises the keyboard, serving as the input device, and the LCD serving as the output device. In recent years, there has been a considerable amount of progress in broadening the functional capability of the user interface of computers. This progress has led to the development of a computer system having an enhanced user interface comprising an LCD, an input device such as a stylus and an electromagnetic graphics surface positioned over the LCD. Computers having this type of enhanced user interface are commonly referred to as electrographic systems or graphics tablets. Operation of a graphics tablet involves positioning the stylus relative to the graphics surface. The graphics surface senses the position of the stylus and generates analog coordinate signals which are digitized by electronics in the graphics tablet and stored in a memory device. The stored digital data may be processed and displayed on the LCD or even sent to a printer.

Currently, graphics tablets operate based on capacitive coupling of the stylus with a position responsive graphics surface to generate output signals. Capacitive coupling may be achieved with a graphics surface having either a grid layer formed of orthogonal linear arrays of spaced conductors or a layer of electrically resistive material.

Significant advantages have been observed in developing a graphics surface having a layer of resistive material, known as a resistive surface device. One advantage is the inherent simplicity in producing a graphics surface which comprises only a layer of resistive material upon a supportive insulative substrate such as glass or plastic. Also, graphics surfaces have expanded industrial applications where the resistive layer and the substrate are transparent.

A variety of technical problems have hindered the development of graphics tablets employing resistive surface devices. One such problem involves the non-uniform nature of the coordinate readouts achieved with the resistive material. Precise linearity is required between the stylus position and the coordinate signals to achieve accurate readouts. Since resistive materials cannot be applied to a substrate without some local resistance variations, the non-linear aspects inherent in this approach have impeded the use of resistive surface devices in applications which demand a very high degree of accuracy. Applications that require highly accurate devices include computer graphics, computer-aided design and computer-aided manufacturing systems.

Several technical advances in utilizing resistive surface devices despite surface non-linearities have been achieved. As an example, substantially improved accuracy for resistive surface devices has been realized through a correction procedure described in U.S. Pat. No. 4,650,926 to Nakamura et al. After manufacturing graphics tablets having a resistive graphics surface, each resistive surface undergoes a calibration procedure such that calibration data for the graphics surface is generated. The calibration data is based on the unique non-linearities associated with a particular resistive surface and is stored in a memory device. The memory device is coupled to a controller board in an electrographics system employing that graphics surface. During the operation of the graphics tablet, the controller board provides four drive signals to the graphics surface. Position coordinate data for the stylus is determined by the controller based on the actual position of the stylus. The controller then employs a correction procedure whereby a given coordinate pair is corrected using calibration data taken from the memory device.

SUMMARY OF THE INVENTION

In existing electrographic systems, the calibration data is loaded into a memory device during the aforementioned calibration procedure. The memory device must then be tracked along with its associated graphics surface during the manufacturing process. As an example, the memory device may be affixed with an identification number which corresponds to a serial number on the associated graphics surface. Eventually, the memory device and its associated graphics surface are mounted together in a graphics tablet.

The calibration data compiled for a graphics surface and stored in a memory device has not previously been used in a mass produced graphics tablet. However, difficulties are anticipated in mass production of graphics tablets with respect to tracking each memory device and its associated graphics surface. Such tracking is essential in assuring that the proper memory device is mounted in a graphics tablet housing with the corresponding graphics surface. In the area of field service, additional difficulties are anticipated to arise when a graphics surface of a prior art graphics tablet requires replacement. Because each graphics surface is unique, the associated memory device mounted on the controller board also must be replaced. Field service personnel can readily remove and replace the graphics surface. The memory device, however, is mounted with the controller electronics on the main electronics board within the graphics tablet housing and is difficult to replace without replacement of the entire controller board.

The present invention solves the aforementioned problems by providing a graphics surface assembly having a memory device integrally coupled to its associated graphics surface. The two are coupled throughout the manufacturing process subsequent to calibration of the graphics surface and storage of calibration data in the memory device. It is not feasible, however, to couple the graphics surface to the controller board throughout manufacturing.

The graphics surface is preferably formed of a conductive layer and an insulative support substrate. Typically, communications with the graphics surface are through a flex cable which is attached to the graphics surface prior to calibration. The flex cable allows for the difficult electrical connection to the conductive layer of the graphics surface. The flex cable also provides the electrical connection to the graphics surface during calibration and thereafter remains connected to the graphics surface.

In accordance with the present invention, the memory device which stores the calibration data for subsequent use by the controller board is integrally coupled to the flex cable. Since the flex cable is electrically connected to the controller board in the final assembly, so is the memory device, preferably through a single connector carrying both the graphics surface control signals and the memory device address and data signals. Thus, in subsequent field-service of the graphics surface assembly, the memory device and the graphics surface may be replaced together.

In a preferred embodiment, the memory device is mounted on an interface board which is remotely located with respect to the controller electronics in the final assembly. The interface board has signal lines for communications with the graphics surface as well as additional signal lines connected to the memory device. Prior to calibration of the graphics surface, the flex cable is attached to the interface board forming a unitary structure. A calibration test procedure is then performed on the resistive layer, and calibration data for that resistive layer is stored in the memory device. The interface board has a single connector which carries both the graphics surface control signals and the memory device address and data signals and is coupled to the controller board in the final assembly via a ribbon cable.

In a alternative embodiment of the present invention, a graphics surface assembly comprises a graphics surface attached to a flex cable having additional signal lines printed thereon and having the memory device mounted directly to the flex cable. The memory device, mounted to the flex cable, is loaded with the calibration data during calibration and is thereafter linked to that graphics surface to which it must be associated. Like the preferred embodiment, the resulting graphics surface assembly eliminates any further requirement for tracking the memory device loaded with the calibration data and its associated graphics surface during the manufacturing process. With the alternative embodiment, the graphics surface and the memory device may also be replaced together.

BRIEF DESCRIPTION OF THE DRAWINGS

In the enclosed drawings like reference characters refer to the same parts throughout the different views. The drawings are not necessarily to scale, emphasis instead being placed upon illustrating the principles of the present invention.

DETAILED DESCRIPTION OF THE INVENTION

Figure 1:
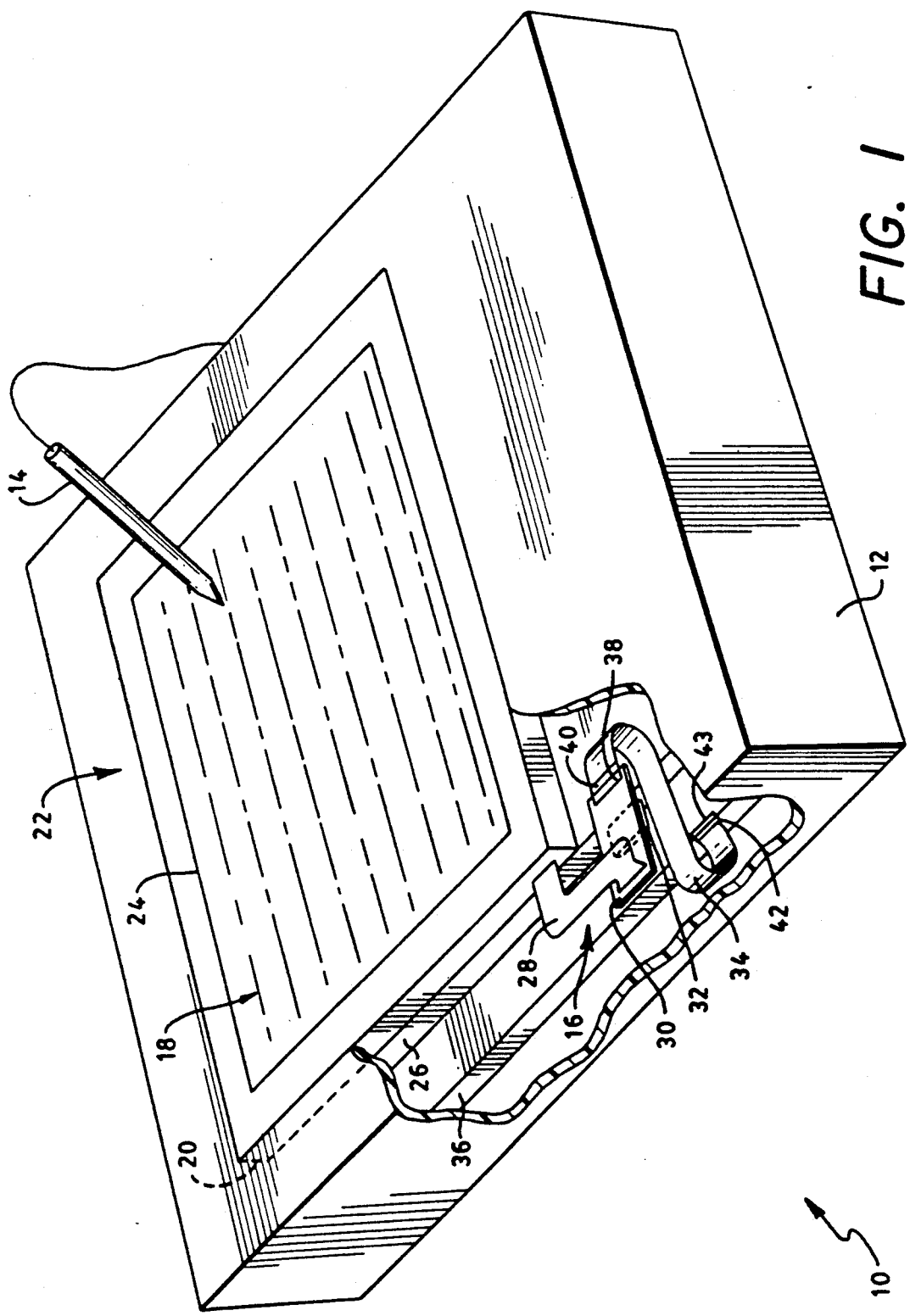
FIG. 1 is a perspective view of an electrographic tablet with a cut-away section illustrating a graphic surface assembly of the present invention.

An electrographic apparatus for application of the present invention is shown in FIG. 1 and described herein. The apparatus comprises a computer 10, or graphics tablet, having a housing 12 which encloses a full microprocessor-based computer system. The user interface is by means of a liquid crystal display 26 and a member 14 which may be a stylus. The position of the member relative to the display is sensed by a transparent graphics surface 22 placed over the display 26. The graphics tablet 10 responds to the position of the member 14 by generating coordinate data.

In accordance with the present invention, a graphics surface assembly comprises a graphics surface 22 having a preferred resistive layer 18 deposited on the back surface of a transparent support substrate 20. The resistive layer 18 is formed of indium tin oxide (ITO), and the support substrate 20 is formed of glass or plastic. The graphics surface 22 resides in the housing 12 adjacent to the liquid crystal display (LCD) 26 which is viewed through the graphics surface.

The graphics surface assembly also comprises a flex cable 28 attached to the graphics surface. The flex cable allows for the difficult electrical connection to the resistive layer of the graphics surface. The flex cable also provides the electrical connection to the graphics surface during calibration as explained later. The flex cable has four signal lines for providing a.c. drive signals to the graphics surface. Electrodes 24 are coupled to the signal lines on the graphics surface for applying the drive signals to the resistive layer 18. Preferably, the controller electronics 35 located on a main electronics board 36 generates the drive signals for the resistive layer. These drive signals are used in conjunction with the resistive layer and the member 14 to generate analog coordinate signals corresponding to the position of the member. More specifically, the controller electronics uses the voltage sensed by the member in conjunction with a source switching process to generate a pair of analog coordinate signals. As an example, a signal corresponding to coordinates (x,y) is translated to analog position data by the following process. The a.c. source signal is applied in one coordinate direction to one edge of the resistive layer while a ground reference is applied to the opposite edge, and the voltage pickup at a stylus is measured. The a.c. signal and ground reference are then reversed for that coordinate direction and the voltage sensed by the member is again measured. The two voltages are manipulated by the controller electronics to determine one coordinate. The process is then repeated for the orthogonal coordinate direction such that the (x,y) coordinates are determined.

The analog coordinate signals are converted to digital position signals by the controller electronics. The controller electronics corrects for errors associated with position signals due to variations in the resistive layer by employing calibration data generated for that resistive layer and stored in a memory device 32. In a preferred embodiment of the present invention, the graphics surface assembly further comprises an interface board 30 having the memory device 32 mounted thereon. The memory device is preferably a Programmable Read Only Memory (PROM) device and is electrically linked to signal lines on the interface board. These signal lines are further linked to signal lines of a ribbon cable 34 via the mated connector pair 38 and 40. The ribbon cable comprises a plurality of signal lines which are linked to the controller electronics by a second mated connector pair 42 and 43. As a result, the PROM is electrically linked to the controller electronics 35.

In the preferred embodiment, the interface board is attached to the flex cable and provides the flex cable with the a.c. drive signals which originate in the controller electronics. As explained above, the ribbon cable 34 provides an electrical link between the interface board and the controller electronics (see FIG. 3). As such, the a.c. drive signals from the controller electronics 35 are sent along the ribbon cable and the interface board to the flex cable and the graphics surface.

The calibration data for each graphics surface is typically generated during the manufacturing process of a graphics tablet. The aforementioned correction procedure is performed such that the graphics surface is tested and calibration data generated for that graphics surface is stored in a PROM. In existing systems, prior to mounting the PROM and its associated graphics surface in a graphics tablet housing, both components are separately tracked. As an example of such tracking, the memory device might be affixed with an identification number corresponding to a serial number on the associated graphics surface. Since the resistive layer of each graphics surface is unique, each PROM containing the calibration data must be tracked along with its associated graphics surface. However, problems have been recognized with separate tracking of a PROM and its associated graphics surface. For example, a PROM may be rejected during quality assurance testing on an assembled graphics tablet which is performed after the calibration procedure. A graphics surface associated with the rejected PROM must be recalibrated so that the calibration data may be loaded into a replacement PROM.

Figure 2:
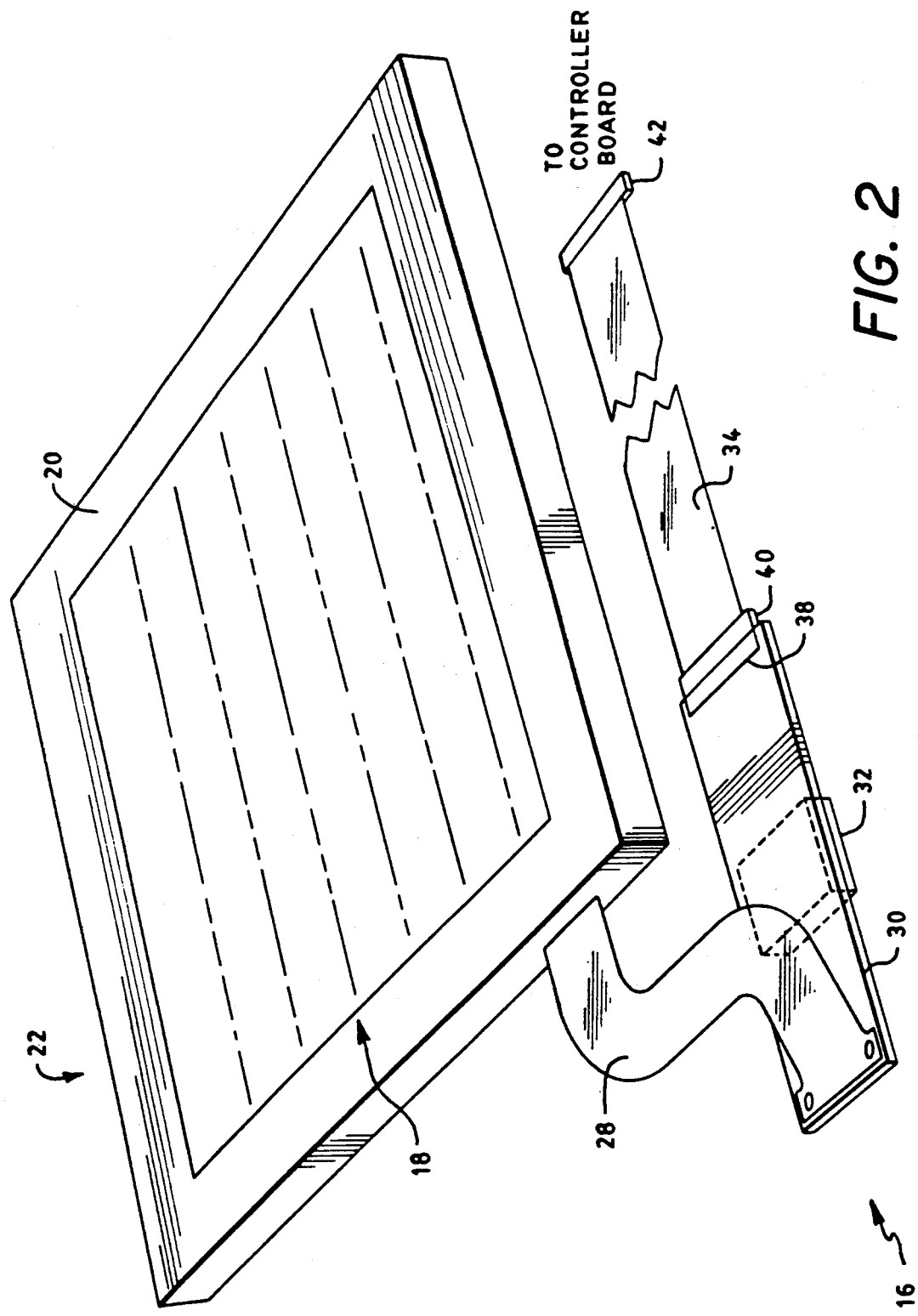
FIG. 2 is an enlarged perspective view of the graphic surface assembly of FIG. 1.

As shown in FIG. 2, the present invention eliminates the aforementioned tracking problems during the manufacturing process by providing a graphics surface assembly 16 having the PROM 32 integrally coupled to its associated graphics surface 22. In the final stages of the manufacturing process for a graphics surface, the PROM 32 is mounted onto the interface board 30, the flex cable 28 is attached to the graphics surface 22 and the flex cable is attached to the interface board. A calibration test procedure is subsequently performed on the resistive layer 18 of the graphics surface and calibration data is generated. The PROM is loaded with this data during the calibration procedure. Unlike existing systems, the PROM loaded with the calibration data is thereafter linked to its associated graphics surface 22. Thus, no further separate tracking of the PROM and the graphics surface is required for the remainder of the manufacturing process of the graphics tablet.

Other problems have been recognized with prior art graphics tablets in the area of field service, specifically when a graphics surface must be replaced. Such replacement is required if a graphics surface is defective or damaged. Since the resistive layer of each graphics surface is unique, replacement of a graphics surface in the field requires replacement of the associated PROM. Field service personnel are able to replace the graphics surface, since it is readily accessible. The PROM, however, is not generally accessible to field service personnel as it is mounted with the controller electronics on the main electronics board in existing systems. Even if the PROM were accessible, it would not be desireable to work on the main electronics board to replace an individual component as field maintenance is generally limited to board-level replacement. Thus, the main electronics board would have to be replaced, or the entire graphics tablet would have to be returned to the factory to accomplish the repairs.

An important feature of the present invention is that the graphics surface assembly (shown in FIG. 2) is a unitary structure having the PROM with calibration data therein integrally coupled to its associated graphics surface. Accordingly, when a graphics surface of the present invention requires field replacement, field service personnel can replace both the graphics surface and the PROM by simply replacing the graphics surface assembly.

Figure 3:
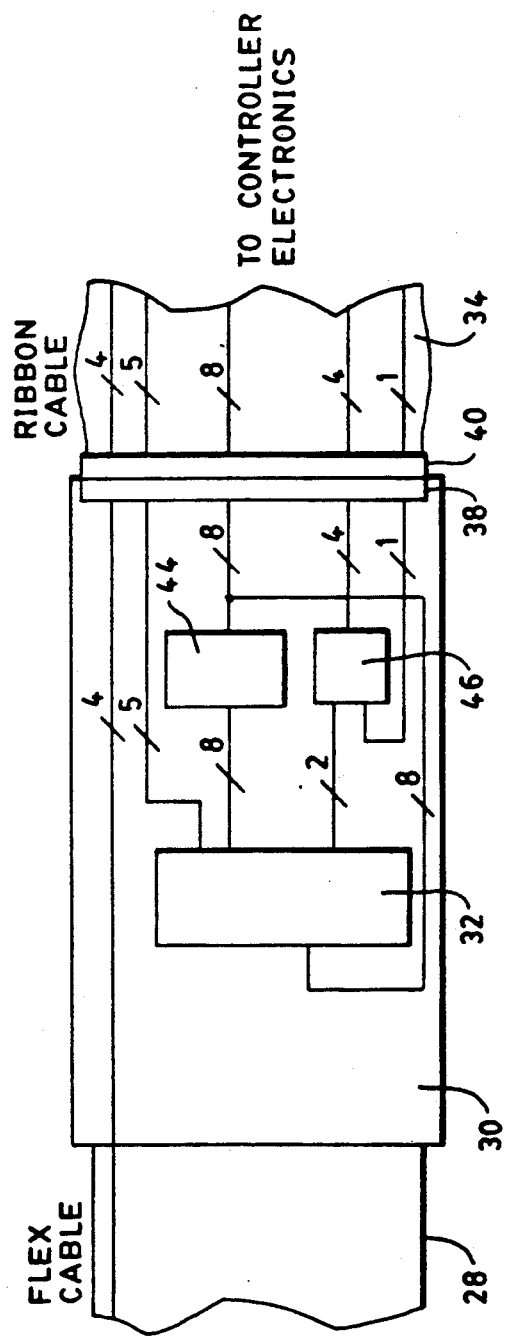
FIG. 3 is an enlarged plan view of the interface board of FIG. 2.

Unlike existing electrographic systems having the PROM located with the controller electronics on the main electronics board, in the present invention the PROM is mounted on the interface board which is remotely located with respect to the controller electronics. Even though the PROM is remotely located, the graphics tablet comprising the present invention is electrically equivalent to existing systems. As shown in FIG. 3, the PROM 32 is mounted on the interface board 30. Support electronics represented at 44 and 46 facilitates communications between the PROM and the controller electronics. The support electronics may comprise a multiplexer 44 and a logic device 46 in a preferred embodiment. The multiplexer multiplexes addresses sent to the PROM and calibration data from the PROM sent to the controller electronics. The logic device provides enable signals to the PROM. In order to keep the parts count down for the system, the PROM is loaded with a handwriting recognition program in addition to the calibration data for a graphics surface. The interface board has signal lines connecting the PROM and support electronics to the ribbon cable 34 by the mated connector pair 38 and 40. As explained previously, the ribbon cable is linked to the controller electronics by the second mated connector pair 42 and 43 (see FIG. 1). Thus, the PROM and support electronics are electrically linked to the controller electronics via the ribbon cable 34. As such, the graphics tablet having its PROM remotely located on an interface board is electrically equivalent to existing systems but comprises the above-described features unique to the present invention.

Figure 4:
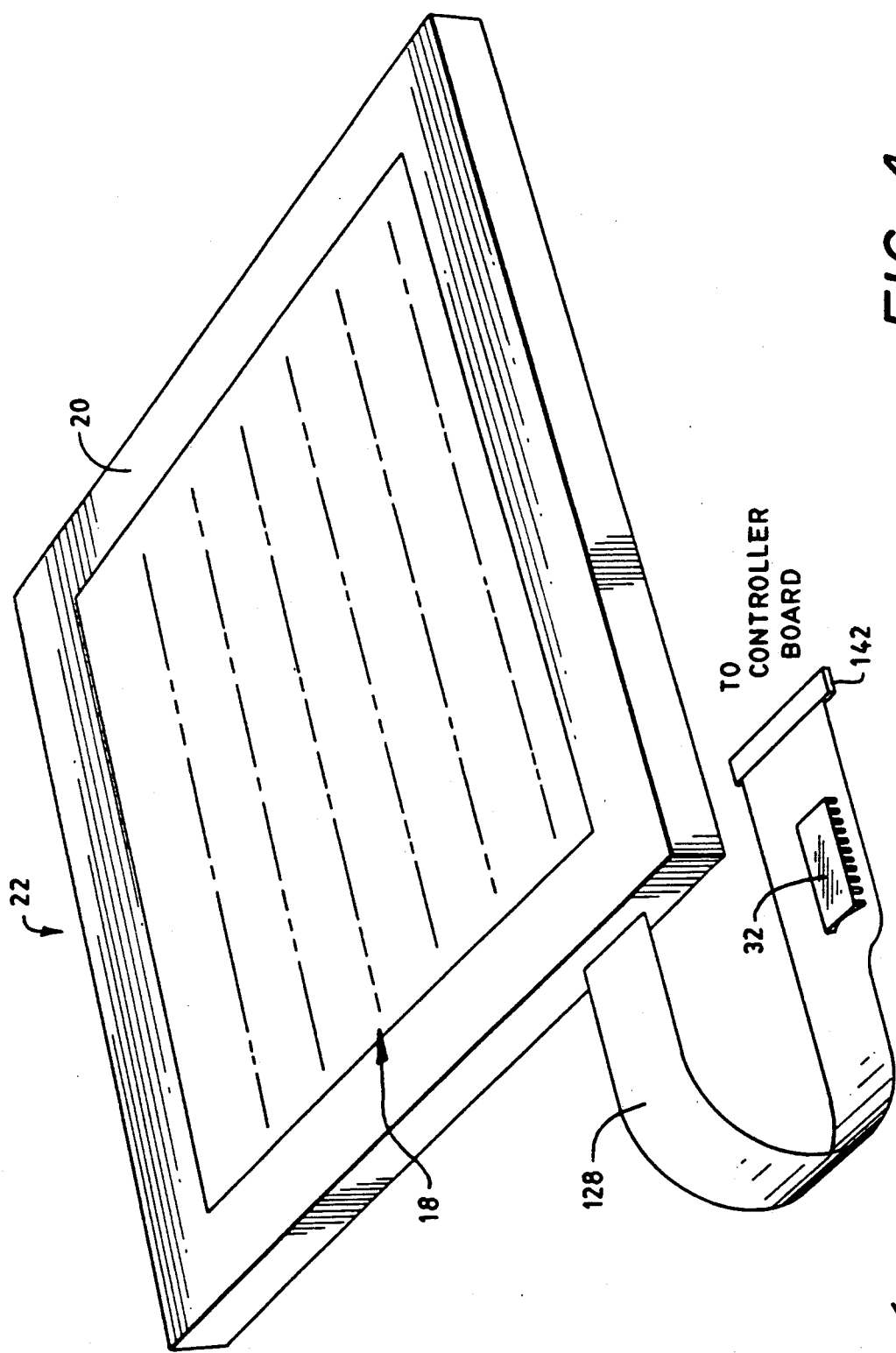
FIG. 4 is an enlarged plan view of an alternative embodiment of the graphics surface assembly of FIG. 2.

In an alternative embodiment of the present invention shown in FIG. 4, a graphics surface assembly 116 comprises a graphics surface 22 attached to a flex cable 128 having additional signal lines printed thereon and having a PROM 32 mounted directly onto the flex cable. The PROM 32, mounted to the flex cable, is loaded with the calibration data generated for the graphics surface 22 during calibration and is thereafter linked to that graphics surface. During manufacturing of electrographic systems, the alternative embodiment of the graphics surface assembly eliminates any further requirement for tracking the memory device loaded with calibration data and its associated graphics surface. The graphics surface assembly of this embodiment is also a unitary assembly, so field service personnel may replace the entire assembly.

In accordance with this embodiment, a graphics surface 18 comprises a resistive layer 18 on an insulative support substrate 20 such as glass or plastic. The resistive layer is preferrably formed of indium tin oxide and has a non-linear surface resistance. Alternatively, the graphics surface may comprise a material having a non-linear surface capacitance on an insulative support substrate. The flex cable 128, which is connected to the main electronics board via connector 142, employs four signal lines for providing a.c. drive signals to the resistive layer of the graphics surface. An additional 20 signal lines on the flex cable provide a connection between the PROM 32 and the controller electronics located on the main electronics board. As in the preferred embodiment, the PROM contains the calibration data for the graphics surface and a handwriting recognition program for the graphics tablet. The PROM functions electrically as if it were still mounted on the controller board, though it is located on the flex cable in this embodiment.

While this invention has been particularly shown and described with references to preferred embodiments thereof, it will be understood by those skilled in the art that various changes in form and details may be made therein without departing from the spirit and scope of the invention as defined by the appended claims.

We claim:

1. In an electographic system in which a controller located on a main electronics board provides position indications for an element positioned relative to a graphics surface, a graphics surface assembly comprising:

a graphics surface having a conductive layer on an insulative support layer;

a first cable connected to the conductive layer of the graphics surface and having signal lines for communications between the conductive layer and the controller; and a memory device coupled to the first cable and remotely located with respect to the main electronics board and having calibration data which the controller accesses to compensate for the conductive layer in providing position indications for the element.

2. A graphics surface assembly as claimed in claim 1 further comprising an interface board connected to the first cable, the interface board having signal lines for communications between the conductive layer and the controller, the interface board having the memory device mounted thereon, and the interface board having additional signal lines for communications between the memory device and the controller.

3. A graphics surface assembly as claimed in claim 2 further comprising a second cable connected to the interface board, the second cable having signal lines for communications with the controller.

4. A graphics surface assembly as claimed in claim 1 wherein the memory device is mounted on the first cable, the first cable having additional signal lines for communications between the memory device and the controller.

5. A graphics surface assembly as claimed in claim 1 wherein the memory device is a programmable read only memory device.

6. A graphics surface assembly as claimed in claim 1 wherein the insulative support layer comprises a transparent substrate.

7. A graphics surface assembly as claimed in claim 1 wherein the conductive layer has a non-uniform surface resistance.

8. A graphics surface assembly as claimed in claim 1 wherein the first cable comprises a flex cable having a printed circuit comprising a plurality of signal lines.

9. A graphics surface assembly as claimed in claim 1 wherein the element positioned adjacent to the graphics surface is a stylus.

10. In an electrographic system in which a controller located on a main electronics board provides a position indication for a member positioned adjacent to a graphics surface, a graphics surface assembly comprising:

a graphics surface having a unique resistive layer deposited on an transparent support substrate;

a flex cable attached to the resistive layer and having signal lines for communications with the resistive layer;

an interface board attached to the flex cable, the interface board having signal lines for communications with the flex cable and having additional signal lines printed thereon; and a memory device mounted onto the interface board and connected to the additional signal lines of the interface board, the memory device being remotely located with respect to the controller, and the memory device having calibration data compiled during a calibration procedure for the graphics surface whereby the calibration data corresponds to the unique resistive layer.

11. In an electrographic system in which a member is positioned upon a graphics surface of a graphics tablet, the graphics surface having a unique conductive layer deposited on an insulative support structure, a cable being connected to the conductive layer for providing electrical signals between the conductive layer and a controller located on a remote main electronics board, the controller being coupled to a memory device also located on the remote main electronics board and having calibration data designated for the unique conductive layer, the controller accessing the calibration data of the memory device for compensating for the unique conductive layer in determining the position of the member relative to the graphics surface; the improvement comprising:

a first cable attached to the conductive layer of the graphics surface, the first cable having signal lines for communications between the conductive layer and the controller; and a memory device coupled to the first cable and having the calibration data for use by the controller in determining the position of the member, wherein the memory device is remotely located with respect to the main electronics board.

12. An electrographic system as claimed in claim 11 further comprising an interface board connected to the first cable and having the memory device mounted thereon and having signal lines for communications with the first cable and having additional signal lines for communications with the memory device.

13. An electrographic system as claimed in claim 12 further comprising a second cable connected to the interface board and having signal lines for communications with the controller.

14. An electrographic system as claimed in claim 11 in which the memory device is mounted onto the first cable, the first cable having additional signal lines for communications between the controller and the memory device.

15. In an electrographic system in which the position of a stylus placed upon a graphics surface is determined by a controller remotely located with respect to the graphics surface on a main electronics board, the graphics surface having an insulative support substrate and a unique resistive layer to which the stylus is coupled, the unique resistive layer being coupled to the controller via a flex cable, the flex cable providing for electrical communications between the resistive layer and the controller, the controller accessing a memory device also remotely located with respect to the graphics surface on the main electronics board, wherein the memory device has calibration data to compensate for non-uniformities in unique resistive layer in determining the position of the stylus; the improvement comprising:

an interface board attached to the flex cable and having signal lines coupled to the controller; a memory device comprising the calibration data and being mounted on the interface board remotely located with respect to the main electronics board and being linked to the signal lines of the interface board for communications with the controller.

16. A method for manufacturing a graphics surface assembly comprising the steps of:
providing a graphics surface formed of a unique resistive layer and an insulative support structure, a flex cable having signal lines for communications with a controller located on a main electronics board and a memory device capable of communications with the controller;
attaching the flex cable to the graphics surface;
coupling the memory device to the flex cable such that the memory device is remotely located with respect to the main electronics board;
generating calibration data for compensating for the unique resistive layer; and
storing the calibration data in the memory device.

17. A method for manufacturing a field replaceable graphics surface assembly as claimed in claim 16 wherein the memory device is mounted on an interface board.

18. A method for manufacturing a field replaceable graphics surface assembly as claimed in claim 16 wherein the memory device is mounted on the flex cable.

19. In an electrographic system having a controller located on a main electronics board for providing position indications for a stylus positioned adjacent to a graphics surface having a unique resistive layer on a transparent support structure, a method for manufacturing a graphics surface assembly comprising the steps of:
mounting a read only memory device onto an interface board, the interface board having signal lines for communications between the memory device and the controller;
coupling the interface board to a flex cable, the flex cable having signal lines for communications between the graphics surface and the controller;
attaching the flex cable with the interface board coupled thereto to the graphics surface;
performing a calibration procedure with respect to the unique resistive layer of the graphics surface to generate data for compensating for the non-uniformities associated with unique resistive layer; and
storing the calibration data in the memory device, the memory device being mounted to the interface board, the interface board being coupled to the flex cable, and the flex cable being attached to the graphics surface.

* * * * *